(No Model.)

W. L. DECKER.
CHAIN ADJUSTMENT FOR BICYCLES.

No. 587,710. Patented Aug. 10, 1897.

Witnesses
A. C. Whiting
Emma Kester

Inventor
William Lloyd Decker.
By his Attorney
Rufus B. Fowler

THE NORRIS PETERS CO., PHOTO-LITHO., WASHINGTON, D. C.

UNITED STATES PATENT OFFICE.

WILLIAM L. DECKER, OF WORCESTER, MASSACHUSETTS, ASSIGNOR TO JOHN A. MEAD, OF RUTLAND, VERMONT.

CHAIN ADJUSTMENT FOR BICYCLES.

SPECIFICATION forming part of Letters Patent No. 587,710, dated August 10, 1897.

Application filed September 3, 1895. Serial No. 561,368. (No model.)

*To all whom it may concern:*

Be it known that I, WILLIAM LLOYD DECKER, a citizen of the United States, residing at Worcester, in the county of Worcester and State of Massachusetts, have invented a new and useful Improvement in Chain Adjustments for Bicycles, of which the following is a specification, accompanied by drawings forming a part of the same, and in which—

Figure 1:
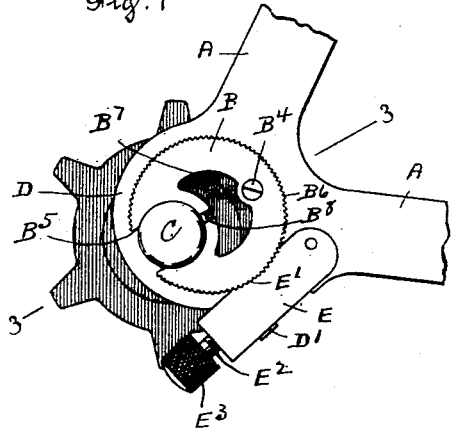
Figure 2:
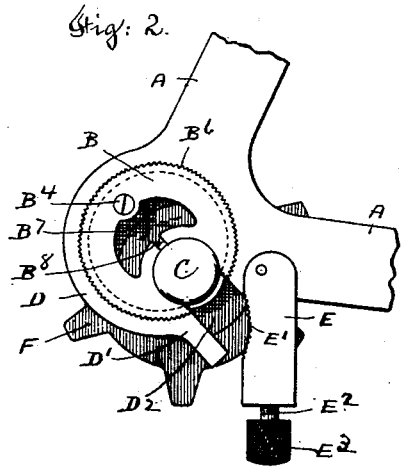
Figure 3:
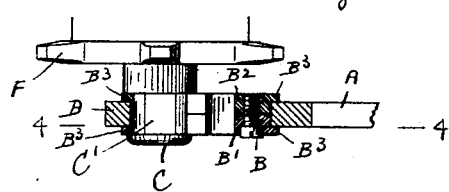
Figure 6:
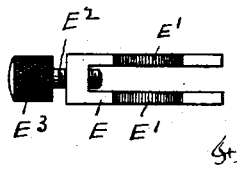
Figure 4:
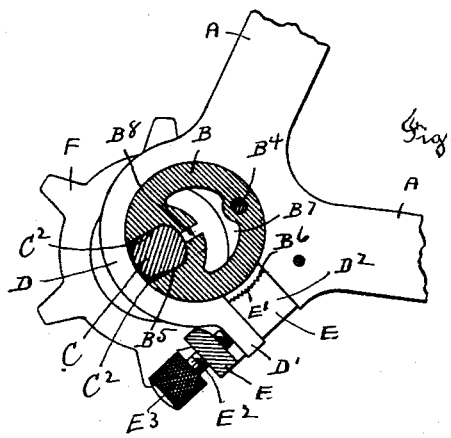
Figure 5:
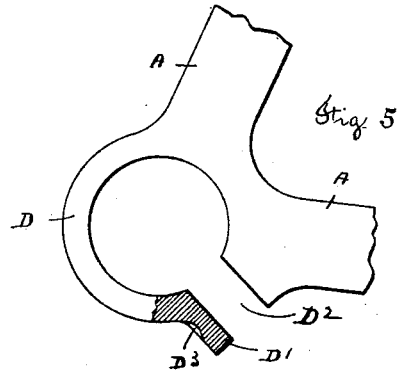

Figure 1 represents a side view of a rear portion of a bicycle-frame supporting the rear hub of the machine and showing my improved device for adjusting the chain. Fig. 2 represents a side view of the same parts as shown in Fig. 1, but with the adjustable portion in a different position and released from the locking-latch. Fig. 3 is a top view, shown in sectional view on line 3 3, Fig. 1. Fig. 4 is a side view similar to that shown in Fig. 1, but having a portion of the locking-latch removed and with the adjustable eccentric shown in sectional view on line 4 4, Fig. 3. Fig. 5 is a side view of that portion of the framework shown in Figs. 1, 2, and 4 with a part thereof shown in sectional view and with the device for adjusting the chain removed; and Fig. 6 represents the locking-latch detached from the framework.

Similar letters refer to similar parts in the different views.

The object of my present invention is to provide means for supporting the rear wheel of a bicycle which will permit the wheel to be removed from the frame without disconnecting the driving-chain and also to provide means for the adjustment of the chain without varying the alinement of the wheel and also to provide means for supporting the rear wheel in the frame without the use of nuts, thereby obviating the necessity of employing a wrench in the removal of the wheel or the adjustment of the chain; and I attain these objects by means of the device hereinafter described, and represented in the accompanying drawings, in which—

A denotes that portion of the framework of a bicycle in which the rear wheel is supported and in which is journaled an eccentric B, preferably made in two halves B' and B², Fig. 3, each half being provided with a flange B³, which overlaps the frame A. The halves B' and B² of the eccentric are held together by means of a screw B⁴, which passes through the part B' and is screwed into the part B².

C denotes the axle of the rear wheel, provided near its end with an annular groove or neck C', which is flattened on opposite sides, as at C², Fig. 4.

The eccentric B is provided upon one edge with a notch B⁵ to receive the neck C' of the axle, which is held from rotating within the eccentric B by the contact of the flattened sides C² with the side walls of the notch B⁵.

The eccentric B is journaled within the frame A, and has its lower half inclosed by a strap D, connected at one end integrally with the frame A, and having its free end terminating in a lug D' with an open space D² between the frame A and the lug D' to allow the axle to enter and be placed within the notch B⁵ of the eccentric, as represented in Fig. 2, a slight rotation of the eccentric serving to carry the axle over the strap D, as shown in Figs. 1 and 4, thereby holding the axle within the notch of the eccentric. The flanges B³ of the eccentric are provided with teeth B⁶, and pivoted to the frame A is a bifurcated locking-latch E, provided with teeth E', adapted to engage the teeth B⁶ of the eccentric and carrying a tightening-screw E², provided with a milled head E³, or, if desired, having a hole to receive a spanner.

The latch E is pivoted at its forked end upon the frame A, and its opposite end is arranged to be carried over and inclose the lug D', thereby bringing the teeth E' into engagement with the teeth B⁶ of the eccentric and locking the eccentric against rotation. The latch E is held in its raised position, as shown in Figs. 1 and 4, by screwing the screw E² against the side of the lug D', as represented in Fig. 4, thereby pinching the elastic strap D against the eccentric.

The face of the lug D' against which the point of the tightening-screw E² bears is slightly concave, as at D³, Fig. 5, and so shaped that the pressure of the screw against the face of the lug will tend to draw the free end of the locking-latch upward.

The eccentric B is provided with a hole B⁷, and the portion of the eccentric between the hole B⁷ and the notch B⁵ is cut apart, as at B⁸, so that the compression of the eccentric by the elastic strap D will serve to press the side walls of the notch against the flattened sides C² of the axle C.

The construction of the framework, adjusting-eccentric, and locking-latch, as above described, is represented in the accompanying drawings upon one side of the machine only, the device being duplicated upon the opposite side, so the rotation of an eccentric upon one side of the machine will cause a simultaneous rotation upon the opposite side, thereby preserving the true alinement of the rear axle, as both ends of the axle will be simultaneously carried by the eccentrics in which they are supported.

Whenever it is desired to tighten or loosen the driving-chain, by which power is imparted to the rear axle through the sprocket-wheel F, the tightening-screws E² are loosened upon each side of the machine, dropping the latches E and releasing the eccentrics B, which are then turned to the right or left, as the case may be, to properly adjust the chain, and the eccentrics are again locked in position by the latches E and screws E².

When it is desired to remove the rear wheel from the frame, the latches E are dropped and the eccentrics turned to bring the notches B⁵ opposite the open space D², as represented in Fig. 2, thereby allowing the axle C to be removed.

I am aware that the adjustment of the chain of a bicycle has been effected by means of an eccentric, and I therefore do not claim such, broadly; but What I do claim as my invention, and desire to secure by Letters Patent, is—

1. The combination with the frame of a velocipede of a pair of eccentrics journaled in said frame and provided with notches in their edges to receive a wheel-axle, a wheel-axle held in said notches, said frame having openings communicating with said eccentric-bearings, a latch pivoted at one end to said frame on one side of said opening and means for attaching the opposite end of said latch to the frame on the opposite side of said opening, whereby said opening is closed, substantially as described.

2. The combination with the framework of a velocipede of a pair of eccentrics journaled in said framework, notches in the edges of said eccentrics to receive a wheel-axle, a wheel-axle held in said notches, said eccentrics having a hole B⁷ and being cut apart at B⁸, between said hole B⁷ and the notch in which the wheel-axle is held, said frame having an opening communicating with the eccentric-bearing, and means for compressing said frame on said eccentric, thereby compressing said eccentric and pinching the wheel-axle held therein.

3. The combination with the frame of a velocipede of a pair of eccentrics journaled in said framework and provided with flanges overlapping said frame, and provided with teeth on their edges, said eccentrics having notches in their edges to receive a wheel-axle, a wheel-axle held in said notches, said frame having an opening communicating with the eccentric-bearing, a latch pivoted at one end to said frame, and means for detachably connecting the opposite end of said latch with said frame, whereby said opening is closed, said latch having teeth adapted to engage the toothed flange of the eccentric, and hold the same from rotation, substantially as described.

4. The combination with the framework of a velocipede, or cycle, of a pair of eccentrics provided with notches in their edges to receive a wheel-axle, a wheel-axle held in said notches, means for retaining said axle in said notches, said framework having an opening communicating with said eccentric-bearing, whereby said axle is removed and means for closing said opening, substantially as described.

Dated this 19th day of August, 1895.

WILLIAM L. DECKER.

Witnesses:
RUFUS B. FOWLER,
EMMA KESTER.